US006964058B2

United States Patent
Fujimura

(10) Patent No.: US 6,964,058 B2
(45) Date of Patent: Nov. 8, 2005

(54) OPTICAL DISK DEVICE

(75) Inventor: Nobuhiko Fujimura, Hachioji (JP)

(73) Assignee: TEAC Corporation, Musashino (JP)

( * ) Notice: Subject to any disclaimer, the term of this patent is extended or adjusted under 35 U.S.C. 154(b) by 322 days.

(21) Appl. No.: 10/208,475

(22) Filed: Jul. 29, 2002

(65) Prior Publication Data

US 2003/0021221 A1 Jan. 30, 2003

(30) Foreign Application Priority Data

Jul. 30, 2001 (JP) ........................................ 2001-229759

(51) Int. Cl.[7] .................... G11B 17/00; G11B 17/04
(52) U.S. Cl. .................... 720/714; 720/708; 720/711
(58) Field of Search ................................ 720/619, 620, 720/706, 707, 708, 711, 713, 714

(56) References Cited

U.S. PATENT DOCUMENTS

| 5,303,098 | A | * | 4/1994 | Yamamori et al. ........ 360/99.12 |
| 6,529,461 | B1 | * | 3/2003 | Watanabe et al. ........... 720/732 |
| 2001/0024419 | A1 | * | 9/2001 | Oowaki et al. ............. 369/271 |
| 2002/0031076 | A1 | * | 3/2002 | Naruki et al. ............... 369/270 |

FOREIGN PATENT DOCUMENTS

| EP | 964396 | A1 | * | 12/1999 | ........... G11B/19/20 |
| JP | 63004454 | A | * | 1/1988 | ........... G11B/17/03 |
| JP | 63285759 | A | * | 11/1988 | ........... G11B/17/04 |
| JP | 6-187712 | | | 7/1994 | |
| JP | 07182754 | A | * | 7/1995 | ......... G11B/17/028 |
| JP | 11-213504 | | | 8/1999 | |
| JP | 2000132892 | A | * | 5/2000 | ......... G11B/17/028 |

* cited by examiner

*Primary Examiner*—William J Klimowicz
(74) *Attorney, Agent, or Firm*—Christensen O'Connor Johnson Kindness PLLC

(57) ABSTRACT

There is provided a thin optical disk device having a slot-in mechanism which is able to smoothly carry out operations of clamping and releasing an optical disk, including an optical pickup which carries out reading and/or writing from/to the optical disk, a turntable which places the optical disk at an operating position of the optical pickup and rotates the optical disk, a clamper which is arranged at an approximate center of the turntable and can freely advance and retreat in a direction of a diameter of the optical disk, and a device for clamping an inside diameter section of the optical disk at a location directly above the clamper with the optical disk being held by sandwiching the optical disk and for pressing the inside diameter section from the side of a non-writing surface of the optical disk and clamping the inside diameter section to the clamper.

23 Claims, 16 Drawing Sheets

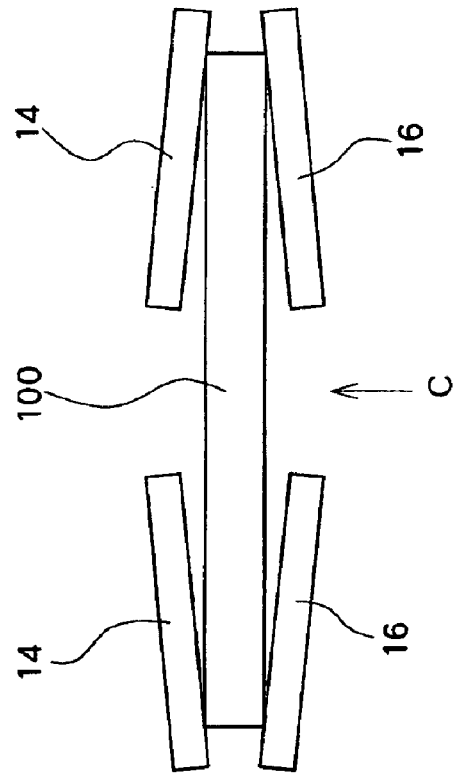
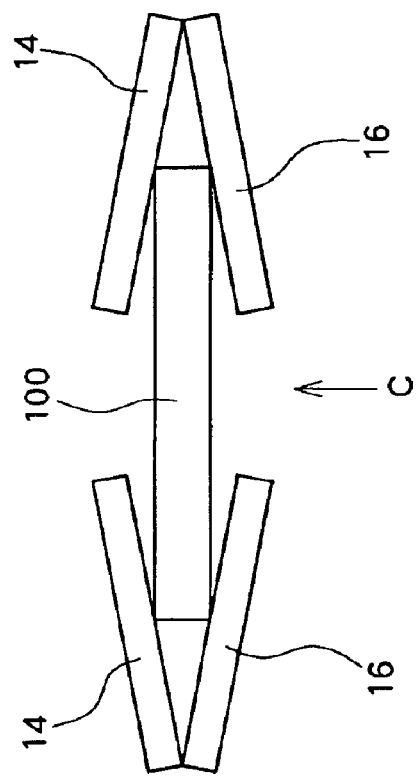
Fig. 3A
Fig. 3B

OPTICAL DISK DEVICE

BACKGROUND OF THE INVENTION

1. Field of the Invention

The present invention relates to an optical disk device, and particularly to a clamp mechanism of an optical disk.

2. Description of the Related Art

Heretofore, an optical disk device which drives an optical disk, such as a CD, a CD-ROM, or a DVD has adopted a slot-in mechanism in which when the optical disk is inserted through a disk insertion opening, the optical disk is carried to a write or read position by means of a carrier mechanism.

In this slot-in mechanism, after the optical disk is carried to a prescribed position, a turntable rises and the optical disk is placed on the turntable. After that, the turntable rises further and a clamper which has been waiting above the turntable sticks to the turntable due to magnetic force of a magnet in the turntable. As a result, the optical disk can be sandwiched between the turntable and the clamper.

However, such a constitution has a problem that it is difficult to make the optical disk device thin because it is necessary to arrange the damper above the turntable.

Also, a large force is required when clamping of the optical disk is released because clamping is performed by magnetic force, which means that the load on a motor increases.

SUMMARY OF THE INVENTION

The present invention aims to provide a thin device which is able to smoothly carry out operations of clamping and releasing an optical disk.

An optical disk device according to the present invention includes:

an optical pickup which carries out at least either of writing or reading of data to or from of an optical disk;

a turntable which places the optical disk at an operating position of the optical pickup and rotates the optical disk;

a damper which is arranged at an approximate center of the turntable and can freely advance and retreat in a direction of a diameter of the optical disk; and means for clamping an inside diameter section of the optical disk at a location directly above the damper with the optical disk being held by sandwiching the optical disk and for pressing the inside diameter section from the side of a non-writing surface of the optical disk and clamping the inside diameter section to the clamper.

According to the present invention, when the optical disk is clamped to the turntable, the optical disk is shifted and clamped to the damper of the turntable. At this time, the inside diameter section of the optical disk is positioned at a location directly above the clamper and the inside diameter section is pressed from the non-writing surface side so as to clamp the inside diameter section to the clamper, as a result of which the optical disk can easily and securely be clamped.

According to an embodiment of the present invention, the clamping means described above tilts a surface of the optical disk toward a surface of the turntable after bringing the surface of the optical disk into contact with the turntable, and then the clamping means clamps the inside diameter section of the optical disk to the clamper.

For example, the clamping means sandwiches a part of an outer circumferential section of the optical disk, brings the inside diameter section of the optical disk into contact with the clamper, and presses the sandwiched part, whereby the optical disk is tilted with the inside diameter section as a fulcrum.

Further, according to another embodiment, the clamping means has retaining means for retaining a semicircular portion of the optical disk and shifting means for moving the optical disk toward the turntable with the optical disk being retained by the retaining means.

Further, according to yet another embodiment, the retaining means, in a state of retaining a semicircular portion of the optical disk, tilts the side of the semicircular portion of the optical disk in advance of other parts by pressing the inside diameter section of the optical disk to the clamper.

Further, according to yet another embodiment, the retaining means moves the optical disk using the shifting means and brings the optical disk into contact with the damper while retaining the optical disk in an inclined state.

Further, according to yet another embodiment, the retaining means is composed of an upper tray and a lower tray which sandwich the semicircular portion of the optical disk.

Further, according to yet another embodiment, in order to hold an outer circumferential section, at least either of the upper tray or the lower tray opens and closes with the outer circumferential section side as a fulcrum.

Further, according to yet another embodiment, at least the upper tray is indented in a conical shape at an area corresponding to the central side of the optical disk so as to hold the outer circumferential section of the optical disk.

Further, according to yet another embodiment, the upper tray has a projection which comes into contact with the inside diameter section and applies pressure on the inside diameter section when the upper tray holds the optical disk.

As described above, by clamping the optical disk in a state where a surface of the optical disk is not made parallel to a surface of the turntable, but the surface of the optical disk is tilted, among the inside diameter sections of the optical disk, an inside diameter section on the tilted side is first engaged with the clamper provided approximately at a center of the turntable and the optical disk is clamped. Thus, positions of the optical disk and the clamper of the turntable are regulated, whereby the remaining inside diameter section of the optical disk can be easily engaged with the clamper and clamping can be executed with a relatively weak force.

Further, in order to clamp the tilted optical disk, it is necessary only to carry out a clamping operation by sandwiching the semicircular portion of the optical disk and not by sandwiching the entire circumferential portion. By sandwiching only the semicircular portion, the optical disk is tilted towards the clamper of the turntable due to the rigidity of the optical disk. Needless to say, it is also possible to tilt the optical disk by applying force to a third point in a direction perpendicular to the surface of the optical disk while supporting the optical disk by two points which are opposite to each other at an angle of 180 degrees.

It should be noted that while the present invention will be understood more clearly with reference to the preferred embodiment as will be described below, the scope of the present invention is not limited to the following embodiment.

BRIEF DESCRIPTION OF THE DRAWINGS

These and other objects of the invention will be explained in the description below, in connection with the accompanying drawings, in which:

FIG. 3A is an explanatory drawing showing operation of an upper tray and a lower tray at the time of holding an optical disk having a large diameter.

FIG. 3B is an explanatory drawing showing operation of an upper tray and a lower tray at the time of holding an optical disk having a small diameter.

DESCRIPTION OF THE PREFERRED EMBODIMENT

An embodiment of the present invention will now be described based on the accompanying drawings.

Figure 1:
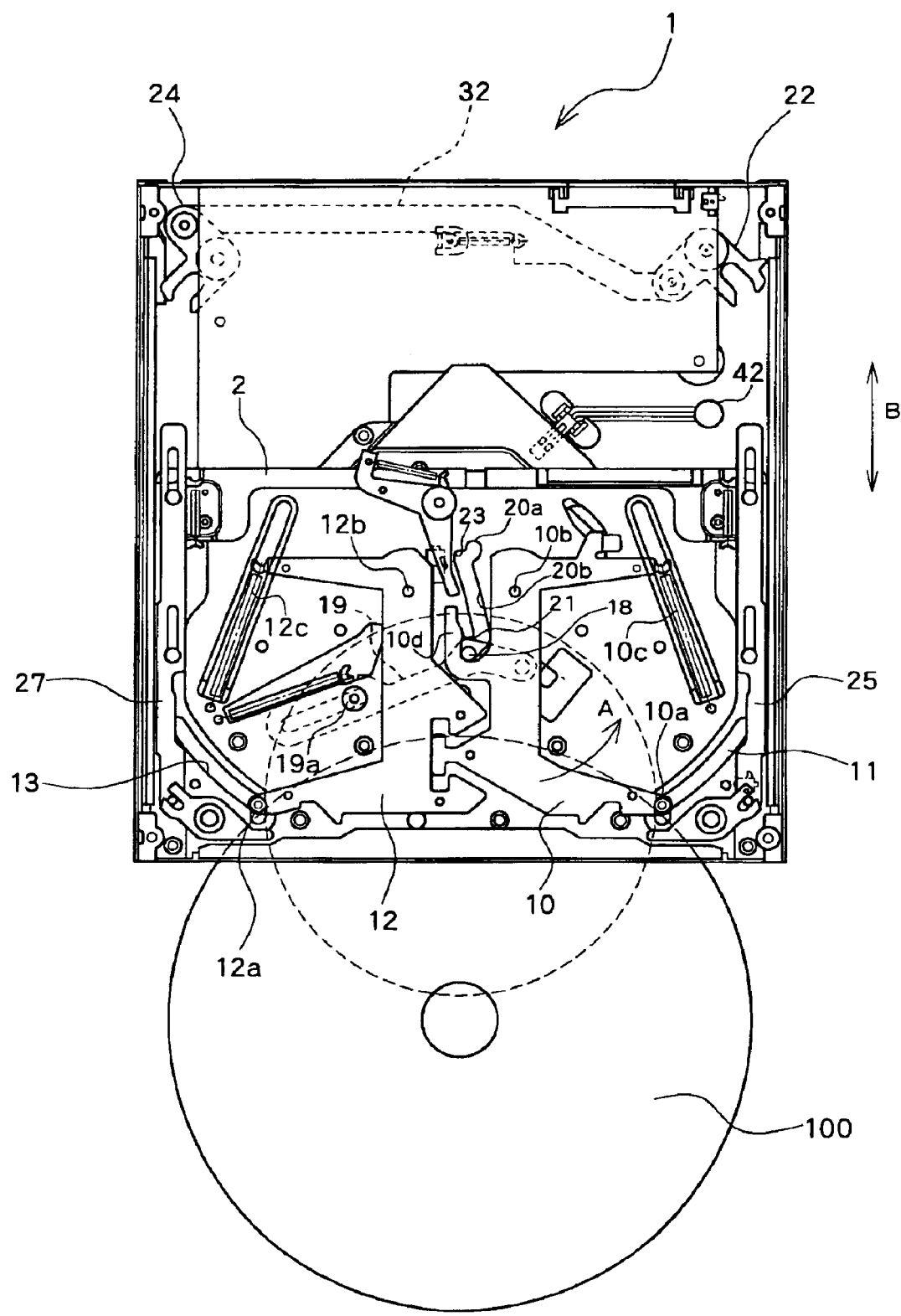
FIG. 1 is a plan view showing an initial state of an optical disk device.

FIG. 1 shows the constitution of an optical disk device according to this embodiment. An optical disk device 1 has an opening section at its front section and a user inserts an optical disk 100 through the opening section. A pair of arms 10 and 12 are installed at a carrier section 2 of the optical disk device 1, and pins 10a and 12a are installed at ends of the arms 10 and 12, respectively.

The arm 10 is connected with the carrier section 2 via an axis 10b which is inserted into the carrier section 2 leaving a space between the axis 10b and the carrier section 2. The arm 10 can rotate and move with the axis 10b as a center within a plane above the carrier section 2. The axis 10b is arranged in an opening (hole), which is formed at the carrier section 2, in a state leaving a space between the axis 10b and the opening, whereby a position of the arm is defined in a rough manner. Also, with rotation of the arm 10, the pin 10a moves along a groove 11 formed at the carrier section 2. A range of rotation of the arm 10 is regulated by the groove 11. Further, the arm 12 is also connected with the carrier section 2 via an axis 12b which is inserted into the carrier section 2 leaving a space between the axis 12b and the carrier section 2. The arm 12 can rotate and move with the axis 12b as a center within a plane above the carrier section 2. With rotation of the arm 12, the pin 12a moves along a groove 13 formed at the carrier section 2. A range of rotation of the arm 12 is regulated by the groove 13.

Further, the other end of the arm 10 is connected to a spring 10c installed at the carrier section 2, and when the arm 10 rotates in a direction of an arrow A in FIG. 1 (counterclockwise), the arm 10 rotates against the resilience of the spring 10c. Therefore, when the arm 10 rotates in a direction of the arrow A in FIG. 1, a restoring force to return the arm 10 to an initial position always acts. The other end of the arm 12 is also connected to a spring 12c installed at the carrier section 2. When the arm 12 rotates in a direction reverse to the direction of the rotation of the arm 10 (clockwise), the arm 12 rotates against the resilience of the spring 12c and a restoring force to return the arm 12 to an initial position also acts.

When a user inserts the optical disk 100 through an opening section at the front, a marginal section of the optical disk 100 comes into contact with the pin 10a of the arm 10 and the pin 12a of the arm 12. When the user inserts the optical disk 100 in such a state, the arm 10 and the arm 12 rotate in opposite directions against the resilience of the spring 10c and the spring 12c. Due to the resilience of the spring 10c and the spring 12c, the pin 10a and the pin 12a are always in contact with the marginal section of the optical disk 100.

The carrier section 2 is supported in such a manner that the carrier section 2 can move freely in a direction of an arrow B in FIG. 1 (a vertical direction in the drawing) along a guide groove formed on a side surface of the optical disk device 1. The carrier section 2 is driven by a driving section composed of a motor and a rack pinion mechanism which are not shown in the drawing. When the optical disk 100 is inserted to a prescribed position, a driving current is applied to the motor and the carrier section 2 carries the optical disk 100 to a write/read position. The carrier section 2 then moves in a direction perpendicular to a paper surface of FIG. 1 (a direction of thickness of the optical disk device 1). The carrier section 2 moves the optical disk 100 downward in a direction of the spindle and clamp the optical disk 100 to the spindle. A further description of operation of clamping the optical disk 100 will be given later.

Figure 16A:
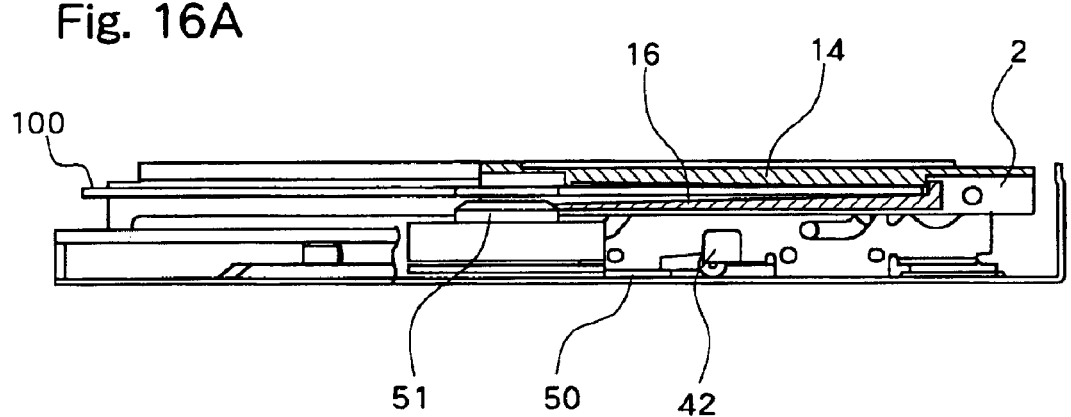
FIG. 16A is an explanatory drawing showing operation at the time of clamping an optical disk.

Further, a lever 42 is provided at a base section of the optical disk device 1. One end of the lever 42 is supported by a spring and the other end is in contact with an upper surface of a base 50 by which an optical pickup and a turntable are supported. This lever 42 is bent and its center is supported by an axis in such a manner that the lever 42 can freely oscillate (see FIGS. 16A through 16C). The base 50 is supported by a cushioning material similarly to conventional bases, and when the end of the lever 42 which is supported by the spring is released, the end is urged upward by elasticity of the spring. Thus, the other end of the lever 42 which is in contact with an upper surface of the base 50 is pushed downward and the base 50 is pushed downward against elasticity of the cushioning material (FIG. 16A). Thus, when the carrier section 2 carries the optical disk 100, the base 50 at which the optical pickup and the turntable are installed retreats downward, thus securing a carrier route.

Figure 2:
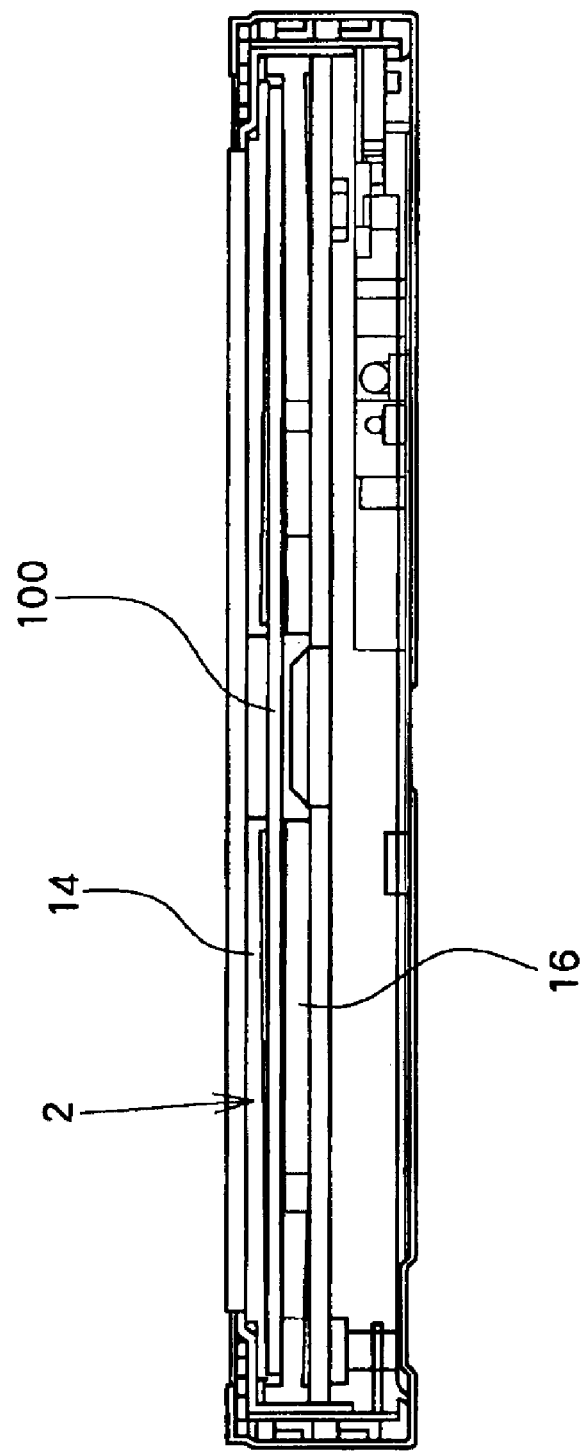
FIG. 2 is a front view of FIG. 1.

FIG. 2 is a front view showing the optical disk device 1 from a direction of an opening section. An upper tray 14 and a lower tray 16 are installed at the carrier section 2 and the constitution is such that the upper tray 14 and the lower tray 16 sandwich the inserted optical disk 100. The upper tray 14 and the lower tray 16 sandwich not the entire circumference of the optical disk 100, but an approximately semicircular portion (a semicircular portion of the optical disk 100 inserted into the carrier section 2).

FIGS. 3A and 3B typically show the upper tray 14 and the lower tray 16. The upper tray 14 and the lower tray 16 are not arranged in such a manner that these surfaces are parallel to each other, but are arranged in such a manner that these trays make certain angles with respect to each other. The lower tray 16 is urged by elasticity in a direction of an arrow C in the drawings, namely, in a direction of the upper tray 14. When the optical disk 100 is inserted, the lower tray 16 is spread out downward against resilience of the lower tray 16. Thus, the optical disk 100 can be securely sandwiched. Also, the optical disk 100 can be sandwiched with the same constitution whether the optical disk 100 having a diameter of 12 cm is inserted as shown in FIG. 3A or the optical disk 100 having a diameter of 8 cm is inserted as shown in FIG. 3B.

Operation when the optical disk 100 is inserted into the opening section and pushed to a prescribed position and the carrier section 2 carries the optical disk 100 to the write/read position will now be described step by step.

<Pushing the Optical Disk>

Figure 4:
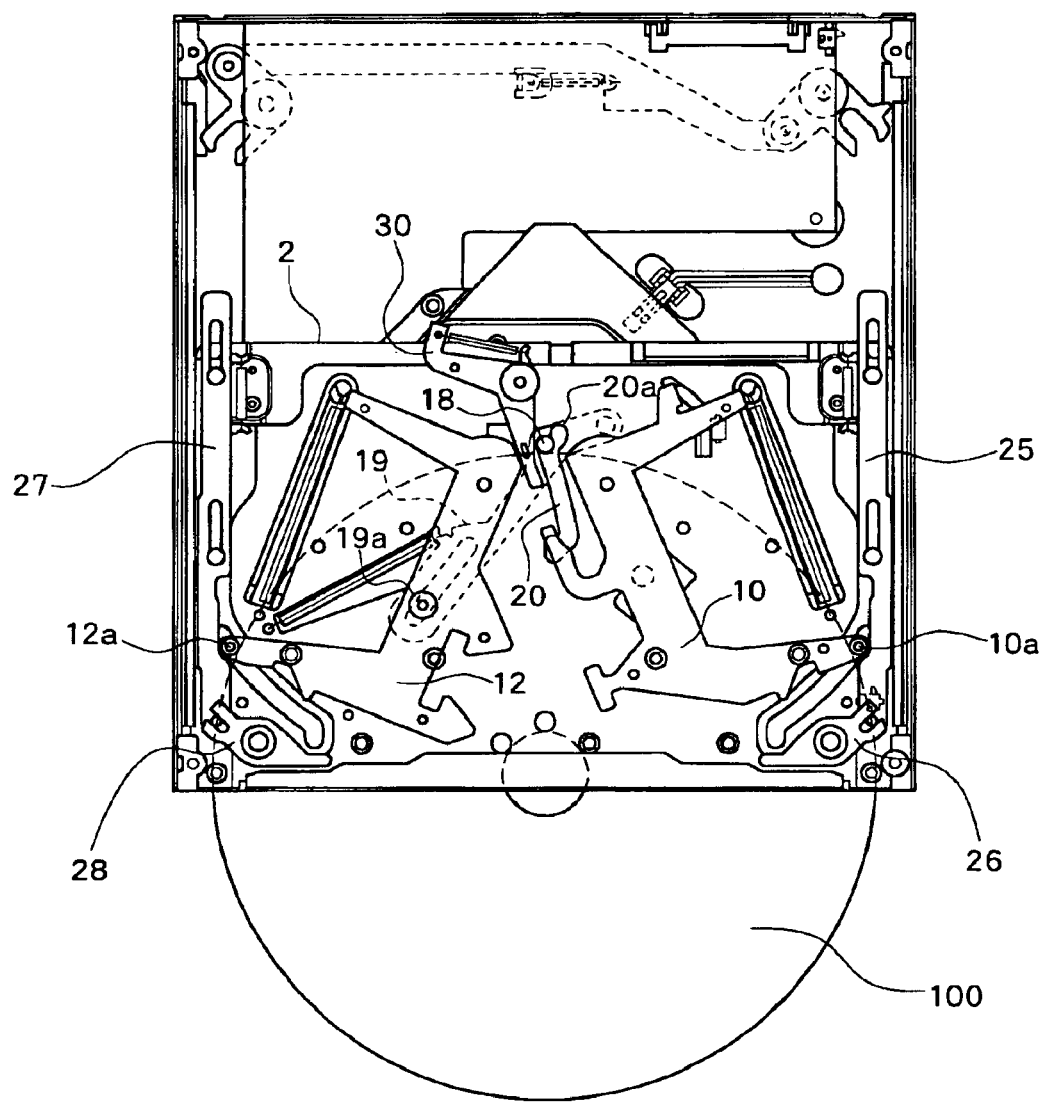
FIG. 4 is a plan view (No. 1) showing operation of stuffing an optical disk.
Figure 5:
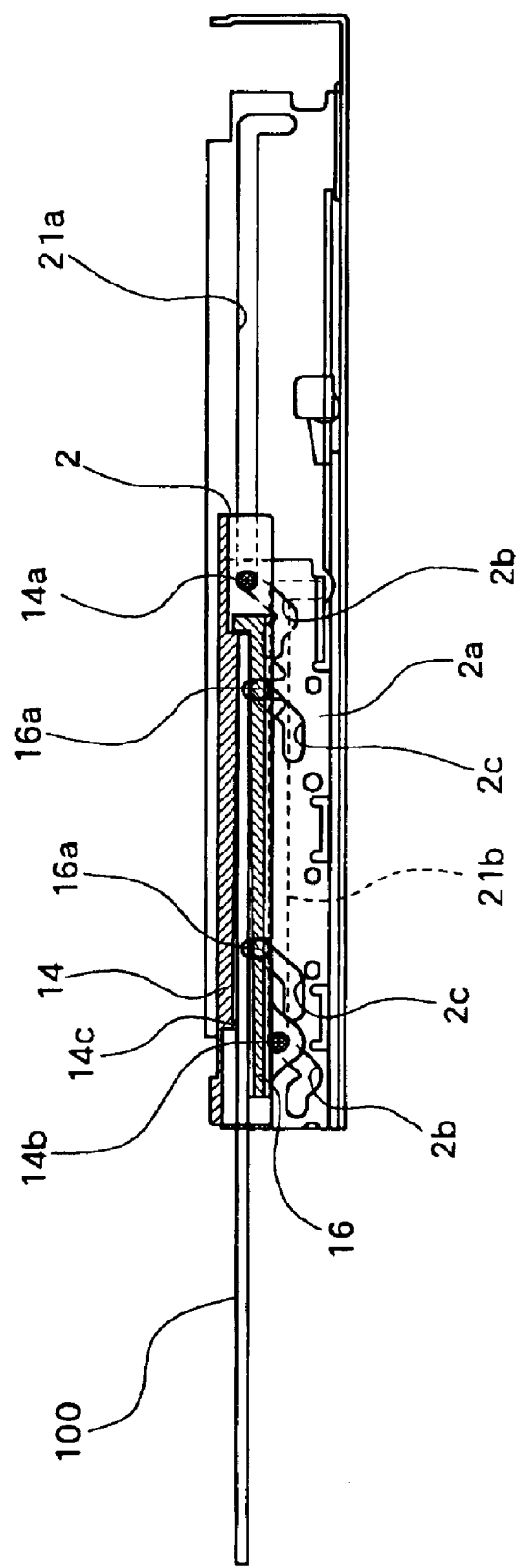
FIG. 5 is a longitudinal sectional view of FIG. 4.

FIG. 4 shows a state where the optical disk 100 is further pushed in from the state shown in FIG. 1. FIG. 5 is a longitudinal sectional view of FIG. 4. When the optical disk 100 is further pushed in from the state shown in FIG. 1, the pin 10a and the pin 12a which are in contact with the optical disk 100 move along a groove 11 and a groove 13, respectively. Further, the optical disk 100 comes into contact with a third pin 18 which is located in a groove 20 provided at the carrier section 2. The third pin 18 is fixed on a pin support plate 19 which is arranged on a rear surface of an upper surface panel of the carrier section 2 via axis 19a in such a manner that the pin support plate 19 can move freely. Since the third pin 18 is connected to the carrier section 2 via the pin support plate 19, reception of the optical disk 100 can be carried out in a stable manner. More specifically, when the optical disk 100 is pushed in further, the third pin 18 moves along the groove 20 and in a short time the third pin 18 comes into contact with one end of the groove 20 (a second stop position) and stops there. Because the third pin 18 comes into contact with the end of the groove 20, further pushing in of the optical disk 100 is prevented and the position of the contact is defined as a final pushing in position of the optical disk 100. Incidentally, the above description applies to an optical disk having a diameter of 12 cm. Thus, when an optical disk having a diameter of 8 cm is inserted, the pin 18 comes into contact with the other end of the groove 20 (a first stop position) and stops there. In FIG. 1, an end 21 formed at the groove 20 shows the first stop position and an end 23 shows the second stop position. In consideration of a difference in size between the optical disk having a diameter of 8 cm and the optical disk having a diameter of 12 cm, the second stop position is formed at an inner part relative to the first stop position. Further, a lateral position of the optical disk 100 is regulated by the pin 10a and the pin 12a located right and left. When the optical disk 100 reaches the final pushing in position, a driving current flows into the motor and the carrier section 2 starts carrying the optical disk 100.

The constitution viewed from a side surface and the relationship of the carrier section 2, the upper tray 14 and the lower tray 16 included in the carrier section 2, and the optical disk device 1 at the time of pushing in the optical disk 100 will be described with reference to FIG. 5.

The optical disk 100 is located in the carrier section 2 in such a state that the optical disk 100 is sandwiched by the upper tray 14 and the lower tray 16. Side surface pins 14a and 14b (for example, two pieces on each side) which are engaged with guide grooves 21a and 21b formed on a frame side surface of the optical disk device 1, via a curved guide groove 2b formed at a side plate 2a of the carrier section 2, in such a manner that a space is left between the side surface pins 14a and 14b and the guide grooves 21a and 21b, respectively, are installed on a side surface of the upper tray 14. Since the side surface pins 14a and 14b move under the guidance of the guide groove 2b and the guide grooves 21a and 21b, movement of the carrier section 2 and prescribed operation of the upper tray 14 which will be described later are realized. On the other hand, a side surface pin 16a (for example, a piece at the front and a piece at the rear) is also formed on a side surface of the lower tray 16, and the side surface pin 16a is engaged with a guide groove 2c, which is formed in the side plate 2a of the carrier section 2, in such a manner that a space is left between the side surface pin 16a and the guide groove 2c. The guide groove 2c is in the shape of a curve so as to guide of rising and falling movement of the lower tray 16, which will be described later. Incidentally, when the optical disk 100 is pushed in, the side surface pins 14a and 14b of the upper tray 14 are located at a side end of an opening section of the guide groove 21a and at the highest part of the guide groove 2b. Further, the side surface pin 16a of the lower tray 16 is also located at the highest part of the guide groove 2c.

<Operation of Carrying the Optical Disk>

Figure 6:
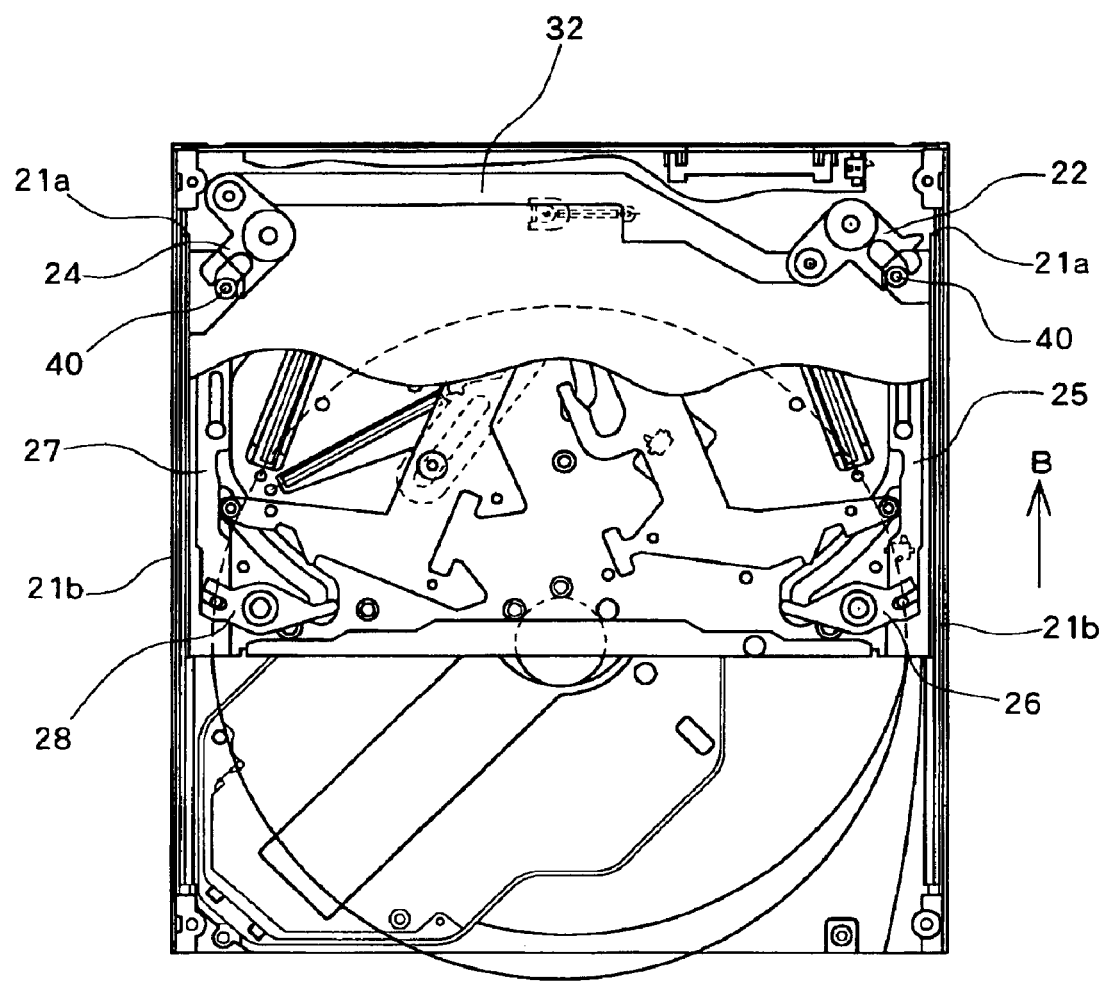
FIG. 6 is a plan view (NO. 2) showing operation of stuffing an optical disk.
Figure 7:
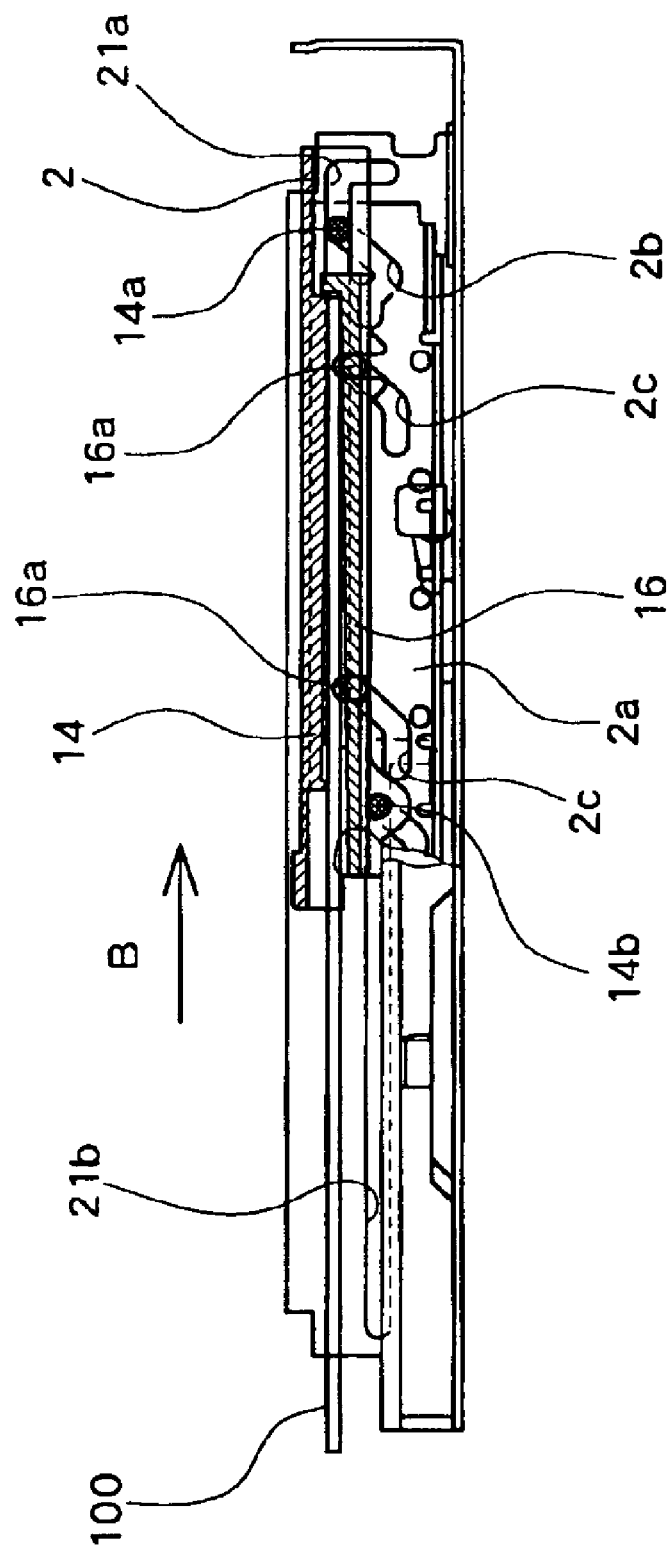
FIG. 7 is a longitudinal sectional view of FIG. 6.

FIGS. 6 and 7 show operation of the carrier section 2 in the middle of carrying the optical disk 100. Due to a rack and pinion, the carrier section 2 moves in a direction of the arrow B shown in FIGS. 6 and 7 along the guide grooves 21a and 21b formed on both of the side surfaces of the optical disk device 1.

When the carrier section 2 moves while sandwiching the optical disk 100, in a short time pins 40 installed at right and left upper ends of the carrier section 2 are engaged with right and left rotators 22 and 24 installed at a base end of the optical disk device 1. The centers of the right and left rotators 22 and 24 are supported by axes on the base, and a forked claw section is formed at one end of each of the rotators 22 and 24 with the other end being connected with a common arm 32. Each of the pins 40 comes into contact with either of the forked parts of the claw section. When the carrier section 2 further moves in a direction of the arrow B shown in FIGS. 6 and 7 while the pin is coming into contact with either of the forked parts of the claw section, the rotators 22 and 24 rotate with the axes as the centers. At this time, each of the pins 40 is located between the forked parts of the claw section. As long as the carrier section 2 moves an equal distance on the right and left sides along the guide groove, there is no problem. However, if there is a difference in an amount of movement on the right and left sides, for example if a distance of movement on the right side is longer than a distance of movement on the left side (in the case where the carrier section 2 as a whole leans counterclockwise), the pin 40 of the carrier section 2 first comes into contact with a claw of the rotator 22 on the right side, and the rotator 22 rotates counterclockwise with the fulcrum as the center. Since the rotator 22 and the rotator 24 are connected with each other by the common arm 32 as described above, rotary motion of the rotator 22 is conveyed to the rotator 24 on the left side via the arm 32 and the rotator 24 is caused to rotate clockwise. Due to the rotation of the rotator 24, the pin 40 on the left side of the carrier section 2 is dragged and a distance of the carrier section's movement on the left side is increased. The same applies to the case when a distance of the carrier section's movement on the left side is longer than a distance of the carrier section's movement on the right side (a case where the carrier section 2 leans clockwise). First, the rotator 24 rotates, interlocking with the rotary motion, the rotator 22 starts rotating, and distances of the carrier section's movement on the right and left sides are equalized. As shown in FIG. 7, since the carrier section 2 as a whole moves towards the optical disk device 1 at this time, the side surface pins 14a and 14b of the upper tray 14 only move along the guide grooves 21a and 21b, and the side surface pins 14a, 14b, and 16a are left at the highest position of the guide grooves 2b and 2c.

Figure 8:
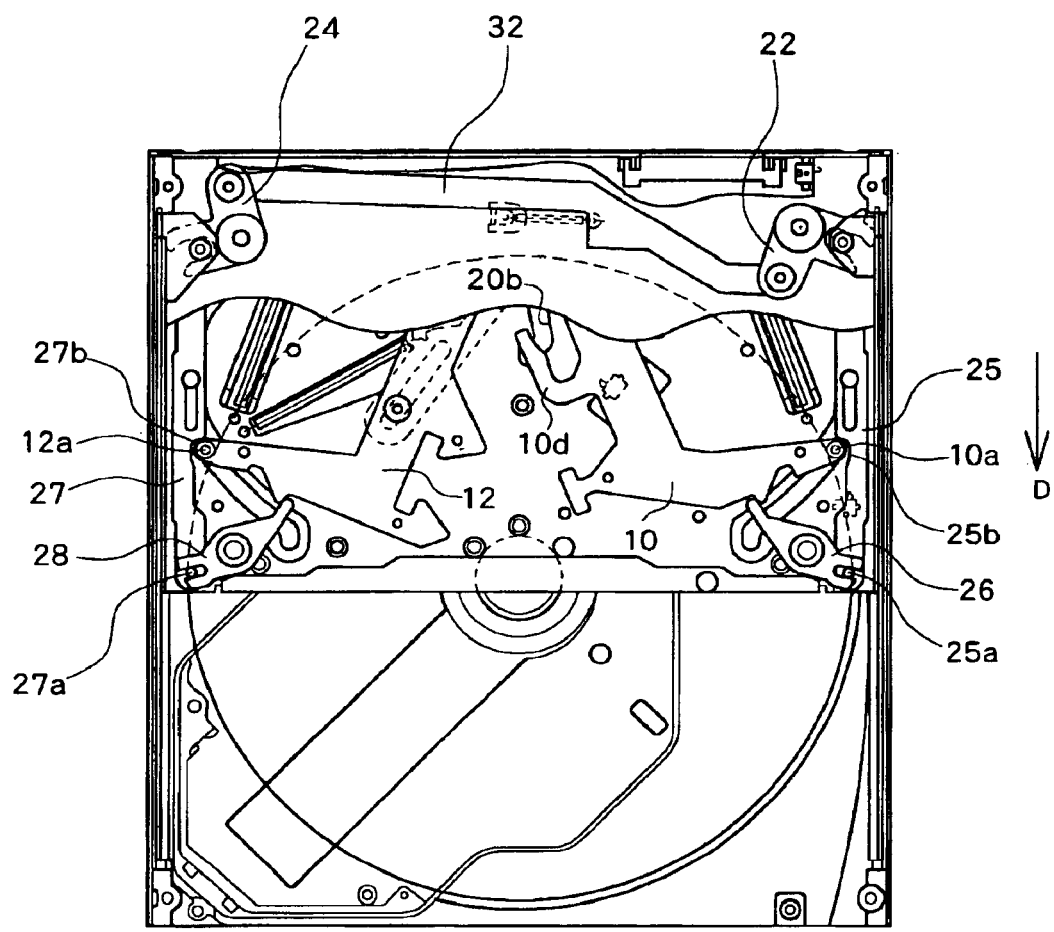
FIG. 8 is a plan view (No. 3) showing operation of stuffing an optical disk.
Figure 9:
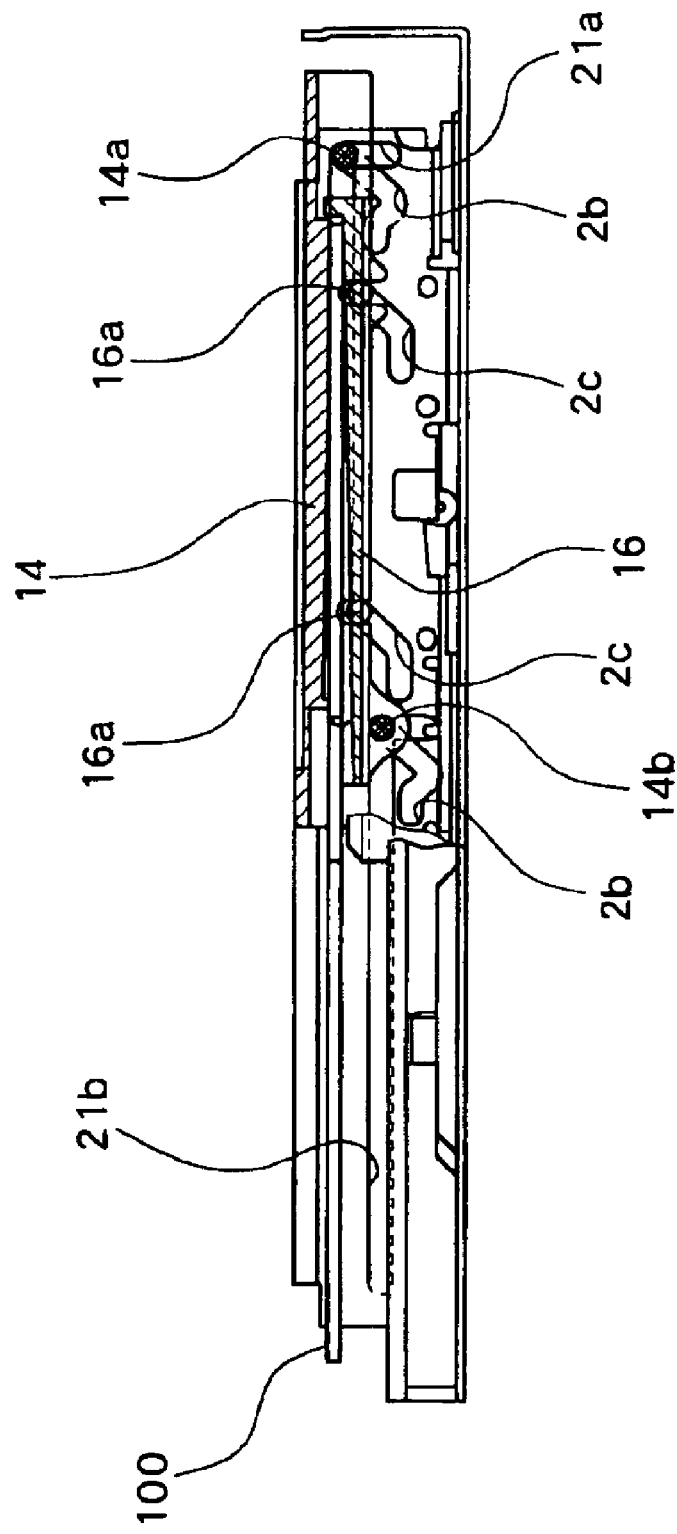
FIG. 9 is a longitudinal sectional view of FIG. 8.
Figure 10:
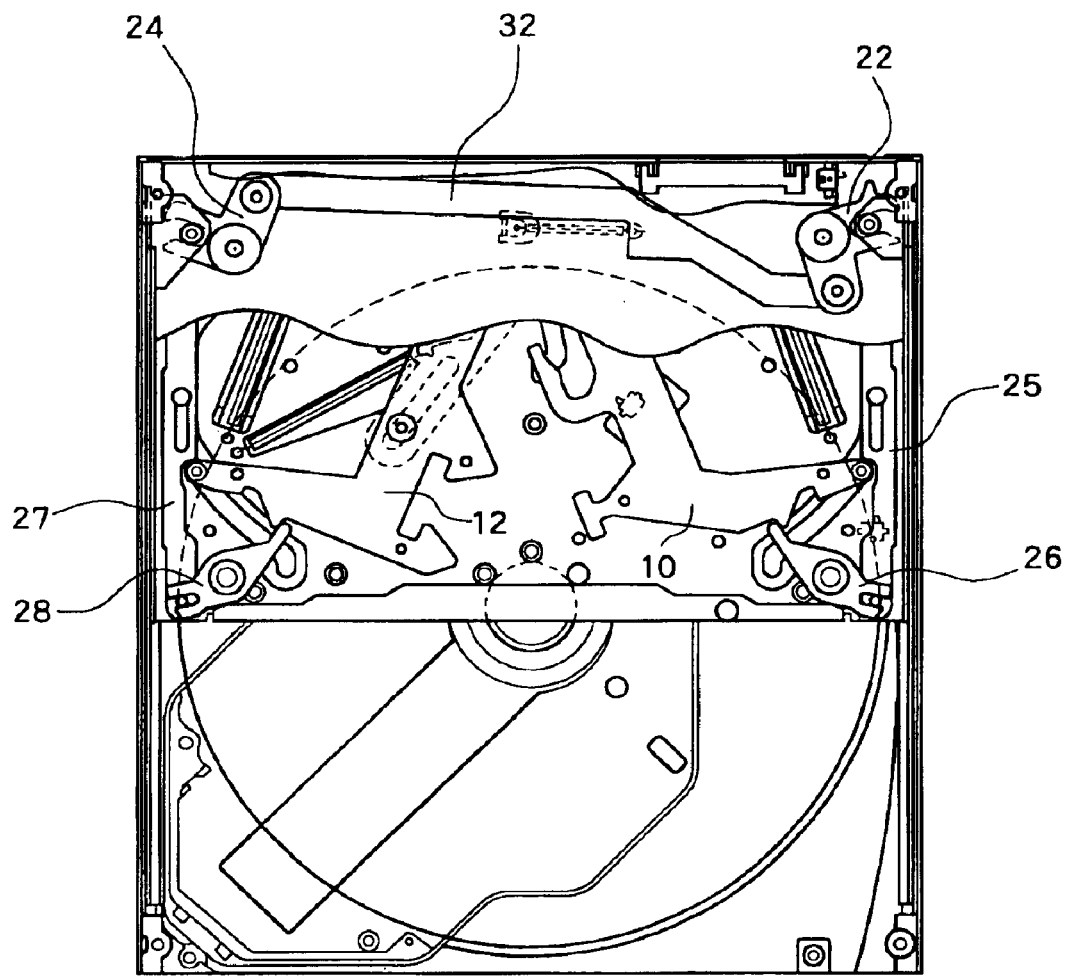
FIG. 10 is a plan view (No. 1) showing a state at the time of clamping an optical disk.
Figure 11:
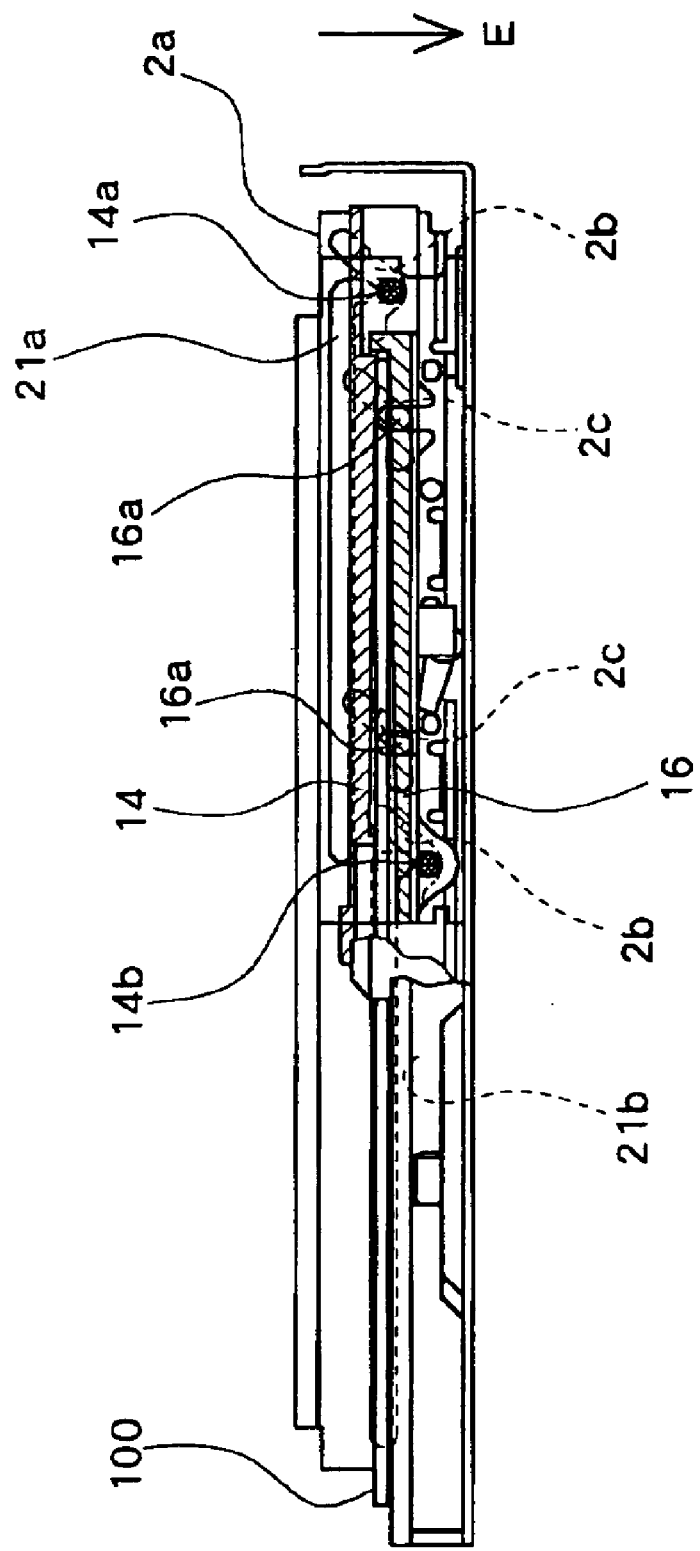
FIG. 11 is a longitudinal sectional view of FIG. 10.
Figure 12:
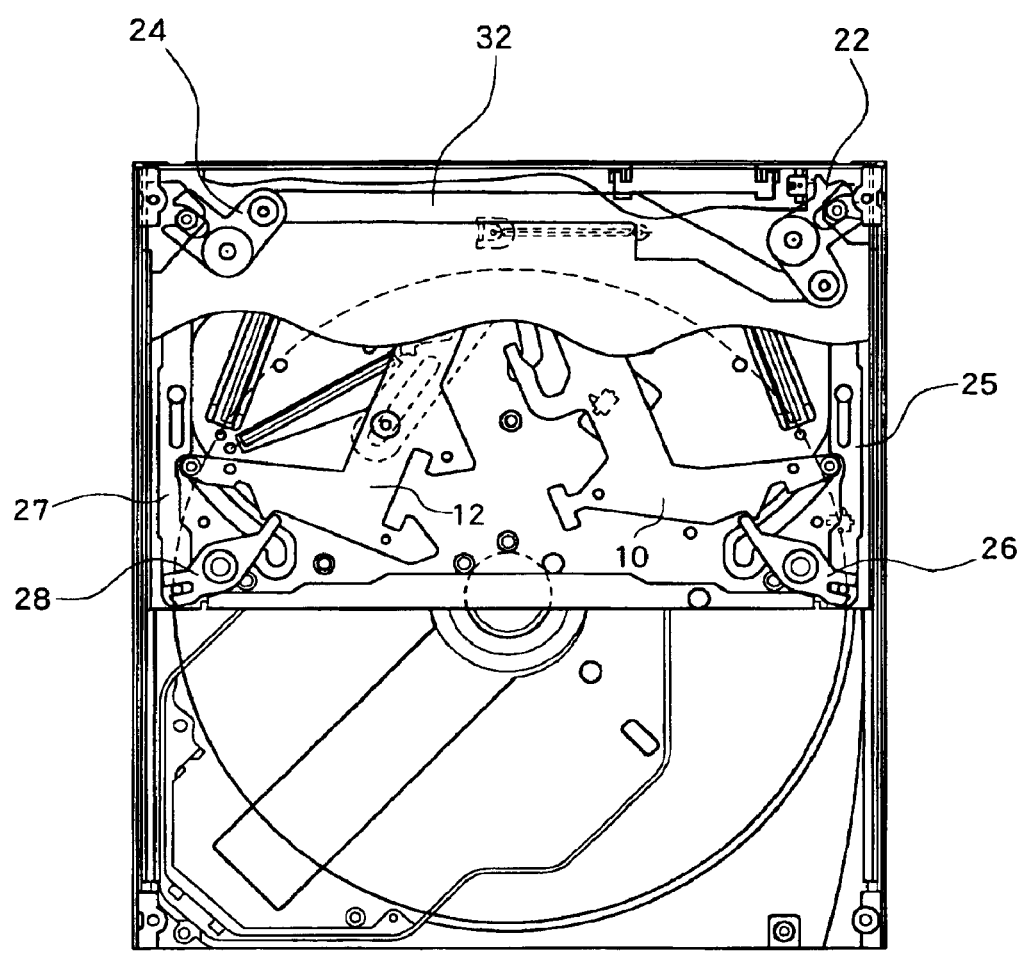
FIG. 12 is a plan view (No. 2) showing a state at the time of clamping an optical disk.

FIGS. 8 and 9 show a state where the carrier section 2 has carried the optical disk 100 to the write/read position in the manner described above. When the carrier section 2 carries the optical disk 100 to the write/read position, mobile pieces 25 and 27 installed on the right and left sides of the carrier section 2 come into contact with an end (an upper end in FIG. 8) of the base and the mobile pieces 25 and 27 move in a direction of an arrow D shown in FIG. 8 relative to the carrier section 2. With respect to the mobile pieces 25 and 27, pins 25a and 27a are formed on the surfaces and notch sections 25b and 27b are formed on the side surfaces. The pins 25a and 27a are engaged with claws of cams 26 and 28, which are formed near the arms 10 and 12 of the carrier section 2, respectively. The notch sections 25b and 27b are located at upper parts (upper parts in FIG. 8) very close to the locations where the arms 25 and 27 come into contact with the pins 10a and 12a, respectively. The cams 26 and 28 are supported by axes on the carrier section 2 in such a manner that the cams 26 and 28 can rotate freely. When the mobile pieces 25 and 27 move in a direction of the arrow D in FIG. 8, the notch sections 25b and 27b move to the locations where the arms 25 and 27 come into contact with the pins 10a and 12b. The cam 26 rotates clockwise and the cam 28 rotates counterclockwise. Due to the rotations of the cams 26 and 28, the cams 26 and 28 are engaged with the arms 10 and 12, respectively. Thus, the arm 10 is caused to rotate further counterclockwise and the arm 12 is caused to rotate further clockwise. Due to the additional rotations of the arms 10 and 12, the pins 10a and 12a which have been in contact with the optical disk 100 additionally move in the grooves 11 and 13, respectively, and the pins 10a and 12a separate from the optical disk 100.

As shown in FIG. 4, a third cam 30 is supported by an axis on the carrier section 2 and an end of the third cam 30 is in contact with the third pin 18 already described. When the carrier section 2 carries the optical disk 100 to the write/read position, the third cam 30 rotates counterclockwise. Because of this rotation, the third pin 18 is moved to a second position 20a in the groove 20. The third pin 18 also comes into contact with the optical disk 100 at the time of carrying the optical disk 100, whereby the pushing in position is defined. However, the third pin 18 separates from the optical disk 100 due to the movement of the third pin 18 to the second position 20a which is interlocked with the rotation of the cam 30.

The above description is related to an optical disk having a diameter of 12 cm. Thus, in the case where an optical disk having a diameter of 8 cm is inserted, the mobile pieces 25 and 27 installed on the right and left sides of the carrier section 2 come into contact with an end (an upper end in FIG. 8) of the base and the mobile pieces 25 and 27 move relatively to the carrier section 2 in a direction of the arrow D in FIG. 8. The pins 25a and 27a formed on the surfaces of the mobile pieces 25 and 27 are engaged with claws of the cams 26 and 28, which are formed near the arms 10 and 12 of the carrier section 2, respectively. The cam 26 rotates clockwise and the cam 28 rotates counterclockwise. As a result of the rotations, the cams 26 and 28 are engaged with the arms 10 and 12, respectively, and the arm 10 is caused to move and rotate upward, namely counterclockwise, and the arm 12 is caused to move and rotate upward, namely clockwise. Due to the additional movements and rotations of the arms 10 and 12, the pins 10a and 12a which have been in contact with the optical disk 100 make additional movements in the grooves 11 and 13, respectively, and separate from the optical disk 100. In the case where an optical disk having a diameter of 8 cm is inserted, an arm 10d formed at the arm 10 shown in FIG. 1 also moves and rotates with the additional movement and rotation of the arm 10. In the case where an optical disk having a diameter of 8 cm is inserted, the third pin 18 in the groove 20 restrains the optical disk having a diameter of 8 cm from being inserted further from a stop position 21. However, due to the movement and rotation of the arm 10d as described above, the arm 10d comes into contact with the third pin 18, and the third pin 18 is caused to move to an escape position 20b in the inner part of the groove 20 (a halfway position of the groove 20). When the optical disk 100 is carried, the third pin 18 comes into contact with a side surface of the optical disk 100, whereby a pushing in position of the optical disk 100 is defined. However, by moving to the escape position 20b, the third pin 18 separates from the optical disk 100 and restraint put on the optical disk 100 is released. Incidentally, FIG. 1 shows a state at the time of inserting an optical disk having a diameter of 12 cm and a position of the third pin 18 is at the time of inserting an optical disk having a diameter of 12 cm.

In a state of the optical disk 100 as described above (the same for the optical disk having a diameter of 12 cm and the optical disk having a diameter of 8 cm), the side surface pins 14a and 14b of the upper tray 14 are located at the innermost parts of the guide grooves 21a and 21b (on the right side in FIG. 9) and carriage of the optical disk 100 in a horizontal direction is completed as shown in FIG. 9. Even in such a state, the side surface pins 14a, 14b, and 16a are left at the highest parts of the guide grooves 2b and 2c.

<Operation of Clamping the Optical Disk>

FIGS. 10 through 13 show clamping operation after the optical disk 100 is carried to the write/read position. While the optical disk 100 is sandwiched by the upper tray 14 and the lower tray 16, the carrier section 2 (at least the upper tray 14 and the lower tray 16) moves in a downward direction (in a direction of thickness of the optical disk device 1) which is perpendicular to a direction of carriage as shown by an arrow E in FIG. 11. This operation is realized such that the side plate 2a of the carrier section 2 moves further in a direction of carriage (in a direction of the arrow B in FIG. 7) and the side surface pins 14a and 14b move to the lowest part of the guide groove 2b along the bent guide groove 2b formed at the side plate 2a of the bent carrier section 2 in a state where movement in a horizontal direction is restrained by the guide grooves 21a and 21b which change the directions into a vertical direction at the ends. Incidentally, the side surface pin 16a of the lower tray 16 whose movement in a horizontal direction is restrained also moves to the lowest part of the guide groove 2c along the guide groove 2c with the movement of the side plate 2a. Due to the downward movement, the inside diameter section of the optical disk 100 is inserted into the clamper of the turntable. A claw or a ball damper which can freely advance and retreat in a direction of the diameter of the optical disk 100 is formed at the damper of the turntable and the inside diameter section of the optical disk 100 is clamped by the claw or the ball clamper.

Here, since only the semicircular portion of the optical disk 100 is sandwiched by the upper tray 14 and the lower tray 16 in this embodiment, the optical disk 100 is clamped with the optical disk 100 being tilted, making it possible to smoothly carry out clamping operation.

Figure 14A:
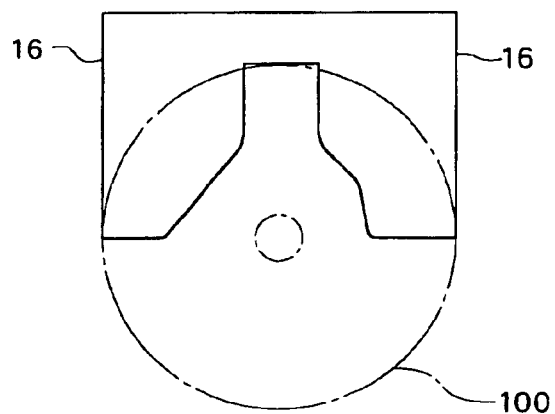
FIG. 14A is a block diagram of a lower tray.
Figure 14B:
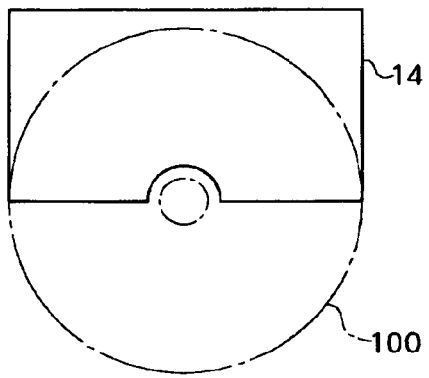
FIG. 14B is a block diagram of an upper tray.
Figure 14C:
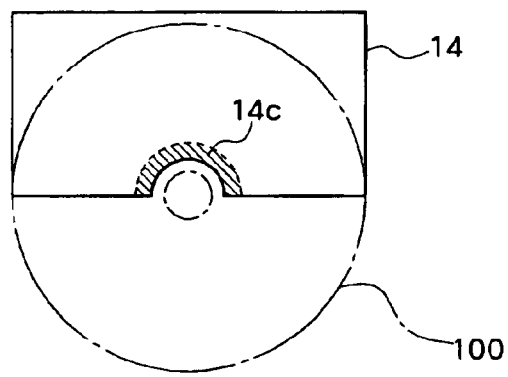
FIG. 14C is a block diagram of an upper tray having a projection.

FIGS. 14A, 14B, and 14C show a location where the upper tray 14 and the lower tray 16 sandwich the optical disk 100. FIG. 14A shows a location of sandwiching the optical disk 100 by the lower tray 16. FIG. 14B shows a location of sandwiching the optical disk 100 by the upper tray 14. Both of the upper tray 14 and the lower tray 16 are located only at the upper half of the optical disk 100 and, as shown in FIG. 3A and FIG. 3B, sandwich only the marginal section of the optical disk 100. If the carrier section 2 moves downward in such a state, the side of the optical disk 100 which is sandwiched by the upper tray 14 and the lower tray 16 will lean downward after the inside diameter section of the optical disk 100 comes into contact with the clamper of the turntable. Incidentally, a surface of the upper tray 14 which is in contact with the optical disk 100 is conical with its center being hollow so that an outer circumferential section of the optical disk 100 can be sandwiched. However, it is possible as a modified example for effectively installing the optical disk 100 at the damper of the turntable, for example, to form a semicircular linear projection 14c near an inside diameter of the optical disk 100 on the contact side of the upper tray 14 as shown in FIG. 14C (see FIG. 5). In this case, since a vicinity of the inside diameter of the optical disk 100 can be pressed by the linear projection 14c against the clamper of the turntable, it is possible to push in the optical disk 100 to the damper while keeping deflection of the optical disk 100 to a minimum.

Figure 15A:
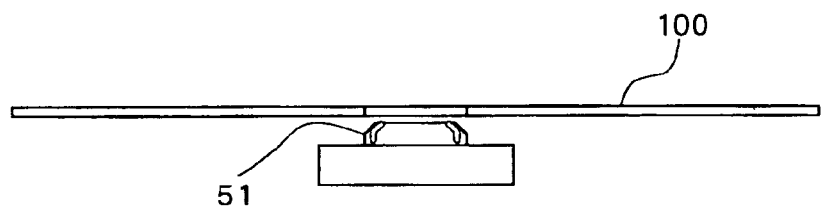
FIG. 15A is an explanatory drawing which shows a positional relationship between an optical disk and a spindle at the time of clamping the optical disk.
Figure 15B:
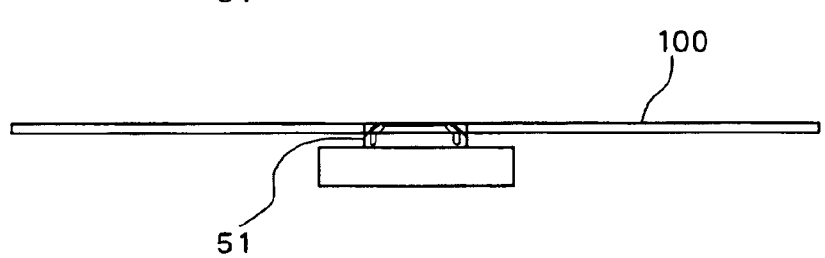
FIG. 15B is an explanatory drawing showing a positional relationship between an optical disk and a spindle at the time of clamping the optical disk.
Figure 15C:
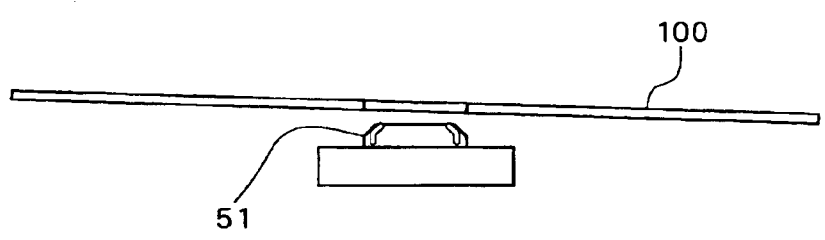
FIG. 15C is an explanatory drawing showing a positional relationship between an optical disk and a spindle at the time of clamping the optical disk.
Figure 15D:
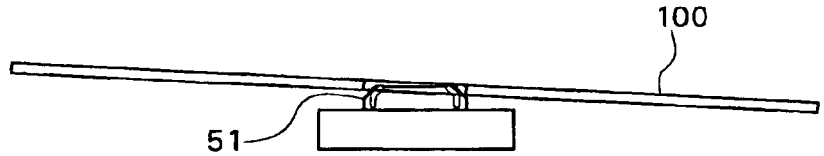
FIG. 15D is an explanatory drawing showing a positional relationship between an optical disk and a spindle at the time of clamping the optical disk.
Figure 15E:
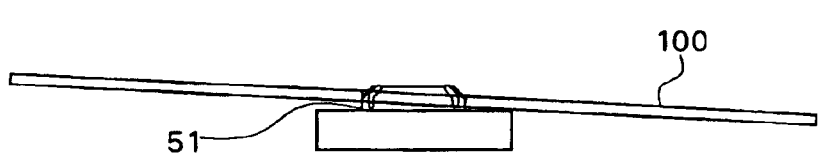
FIG. 15E is an explanatory drawing showing a positional relationship between an optical disk and a spindle at the time of clamping the optical disk.

FIGS. 15A through 15E typically show a state where the optical disk 100 leans at the time of clamping. FIG. 15A shows a state in which the carrier section 2 moves downward and the inside diameter section of the optical disk 100 comes close to a damper 51 of the turntable. FIG. 15B shows a state that the carrier section 2 further moves downward while sandwiching the optical disk 100 and also the inside diameter section of the optical disk 100 comes into contact with a tip of the clamper of the turntable. When the carrier section 2 further moves downward in this state, urging force is applied to the semicircular portion of the optical disk 100 which is sandwiched by the upper tray 14 and the lower tray 16, whereby the semicircular portion moves downward earlier than a remaining semicircular portion moves. FIG. 15D shows a state where the optical disk 100 leans from the state shown in FIG. 15B due to the urging force. At the tip of the damper 51, a plurality of claws or ball clampers are installed at symmetrical positions, for example at three symmetrical positions, and elastic support is provided in order for the claws or the ball clampers to withdraw in a direction of the diameter of the optical disk 100 when force is applied. Since the optical disk 100 moves downward while leaning, the semicircular portion on the leaning side is engaged with the claws or the ball dampers easier than the remaining semicircular is. Thus, the inside diameter of the optical disk 100 is first clamped at this portion on the leaning side. FIG. 15E shows a state where a part of the inside diameter section of the optical disk 100 is clamped. Afterwards, if the carrier section 2 makes a further downward movement, the remaining semicircular portion which has not been clamped will be engaged with the claws or the ball dampers and clamped.

As described above, by inserting the optical disk 100 into the damper 51 of the turntable while sandwiching only the semicircular portion of the optical disk 100, it is possible to clamp the optical disk 100 while tilting the optical disk 100. Thus, it is possible to clamp the optical disk 100 with a less powerful force compared with the case where the inside diameter section of the optical disk 100 is simultaneously clamped. Incidentally, FIG. 15C shows such an example where the optical disk 100 has already been tilted before the optical disk 100 comes close to the damper 51. More specifically, this is an example in which the optical disk 100 is positively tilted when the optical disk 100 is sandwiched by the upper tray 14 and the lower tray 16, or while the optical disk 100 is coming close to the damper 51 in a state of being sandwiched. Also in this case, after the optical disk 100 comes into contact with the damper 51, the same state as that of FIG. 15D is brought about.

Figure 13:
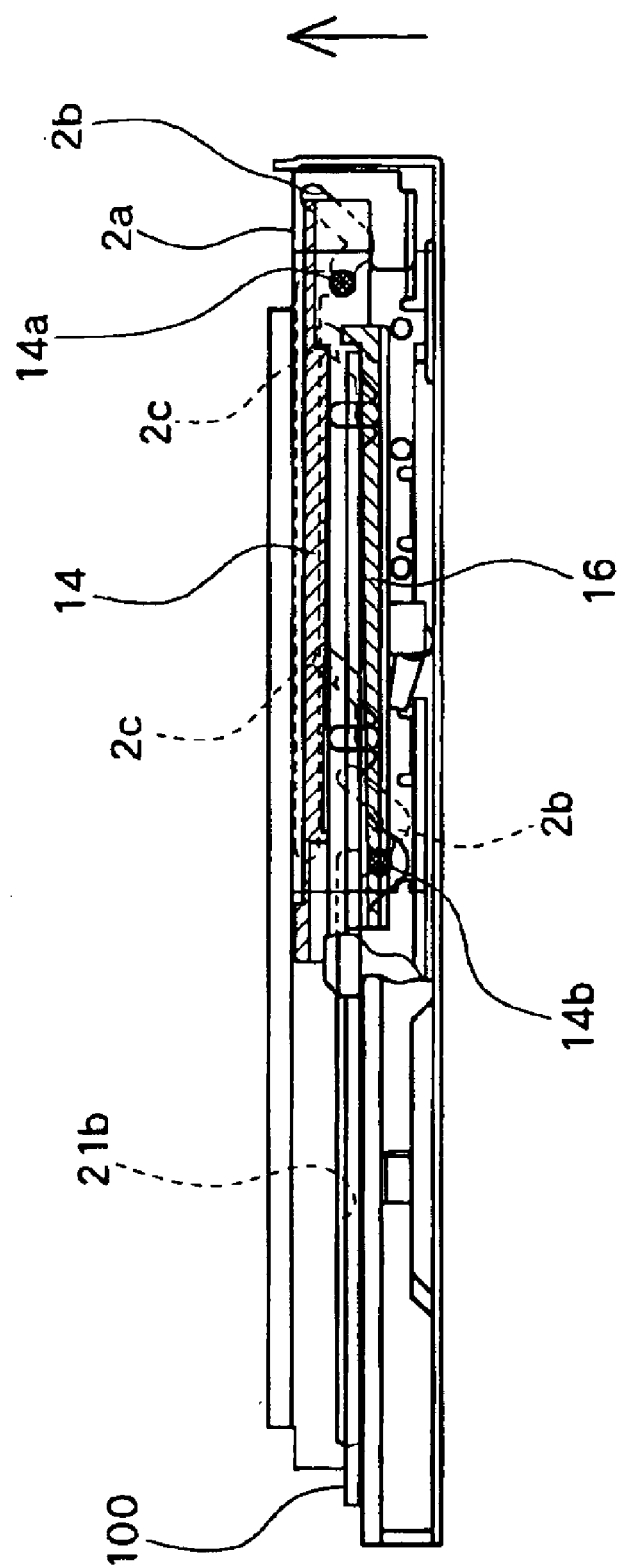
FIG. 13 is a longitudinal sectional view of FIG. 12.

After the optical disk 100 is clamped in the manner described above, the upper tray 14 is caused to move upward. More specifically, since the side plate 2a of the carrier section 2 moves further in a direction of carriage (in a direction of the arrow B in FIG. 7) as shown in FIG. 13, the side surface pins 14a and 14b of the upper tray 14 move further along the guide groove 2b which is bent upward (see FIG. 5 and the like), whereby the upper tray 14 is caused to move upward. Further, the lower tray 16 is caused to make a further downward movement by operation of the side plate 2a similarly and separate from the optical disk 100. Thus, the optical disk 100 can freely rotate in a state where the optical disk 100 is clamped by the damper of the turntable. FIG. 13 shows a state where clamping by the upper tray 14 and the lower tray 16 is released.

Figure 16B:
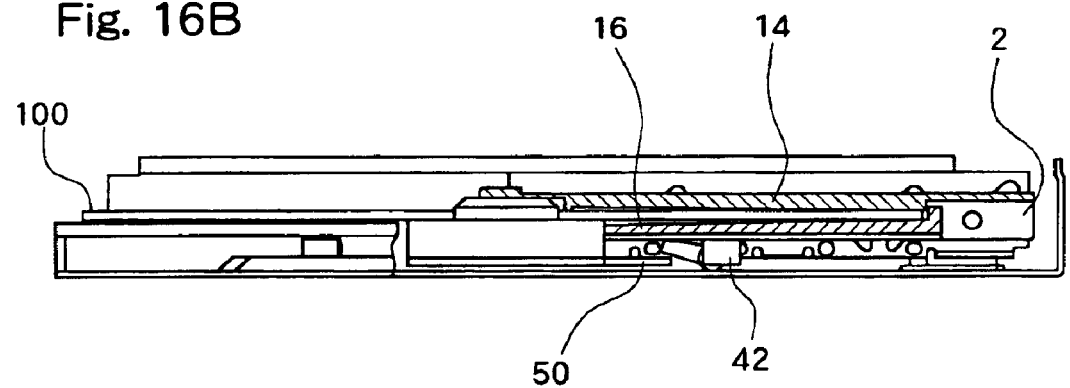
FIG. 16B is an explanatory drawing showing operation at the time of clamping an optical disk.
Figure 16C:
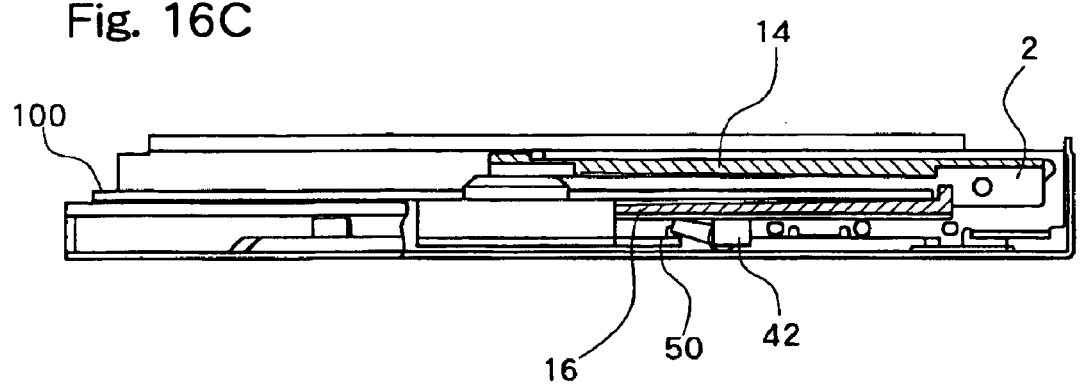
FIG. 16C is an explanatory drawing showing operation at the time of clamping an optical disk.

FIGS. 16A through 16C more particularly show a sequence of operation of clamping the optical disk 100. When the optical disk 100 is carried to the write/read position as shown in FIG. 16A, the inside diameter section of the optical disk 100 is located approximately directly above the damper 51 of the turntable. As shown in FIG. 16B, the carrier section 2 moves downward in this state, and the optical disk 100 sandwiched by the upper tray 14 and the lower tray 16 also moves downward and is inserted into the damper 51 of the turntable.

Further, the other end of the lever 42 moves upward due to oscillation and therefore the base 50 which supports the optical pickup and the turntable moves upward due to elasticity of a cushioning material. It should be noted that a position of the other end of the lever 42 and a position of the base 50 differ in FIG. 16A and FIG. 16B.

Finally, as shown in FIG. 16C, the upper tray 14 of the carrier section 2 is caused to move upward again and the upper tray 14 which has pressed the optical disk 100 from the above is caused to separate from the optical disk 100. Further, the lower tray 16 is released from the carrier section 2 and is caused to make a further downward movement contrarily to the carrier section 2 and the lower tray 16 is caused to separate from the optical disk 100. In a state in FIG. 16C, the inside diameter section of the optical disk 100 is clamped only to the turntable and is not in contact with any of the pins 10a, 12a, and 18 and the upper tray 14 and the lower tray 16, whereby the optical disk 100 rotates due to the rotation of the turntable and writing/reading is possible.

Incidentally, according to this embodiment, by moving the optical disk 100 downward while sandwiching a semicircular portion of the optical disk 100, the optical disk 100 is clamped with the optical disk 100 being tilted. However, it is possible to have a constitution such that when the carrier section 2 moves downward, the optical disk 100 is more positively caused to move downward with the optical disk 100 being held askew and the optical disk 100 is inserted in a tilted state (see FIG. 15C).

Further, in this embodiment, description of an operation where the optical disk 100 is carried to the write/read position and clamped to the damper of the turntable is given. However, in order to release clamping of the optical disk 100 and carry the optical disk 100 to the initial position, it is merely necessary to perform operation reverse to the operation described above. For example, with respect to release of clamping, the upper tray 14 is moved downward and brought into contact with the optical disk 100 and, at the same time, the lower tray 16 is moved upward and a semicircular portion of the optical disk 100 is sandwiched by the upper tray 14 and the lower tray 16. The carrier section 2 then moves upward. Since the carrier section 2 moves upward while sandwiching the semicircular portion of the optical disk 100, the optical disk 100 leans askew, clamping of the semicircular portion sandwiched is first released, and clamping of the remaining semicircular portion is then released. It is possible to easily release clamping by moving the optical disk 100 upward with the optical disk 100 being tilted.

As described above, according to the present invention, the optical disk can be securely clamped.

While the preferred embodiment of the present invention has been described using specific terms, such description is for illustrative purposes only, and it is to be understood that changes and variations may be made without departing from the spirit or scope of the appended claims.

What is claimed is:

1. An optical disk device comprising:
    an optical pickup which carries out at least either of writing or reading data into or out of an optical disk;
    a turntable which places said optical disk at an operating position of said optical pickup and rotates said optical disk;
    a clamper which is arranged at an approximate center of said turntable and can freely advance and retreat in a direction of a diameter of said optical disk; and
    means for clamping a section of said optical disk at a location directly above said clamper by sandwiching said optical disk and for, while the optical disk is sandwiched by said clamping means, pressing together an inside diameter section of said optical disk and the clamper to clamp said inside diameter section to said clamper.

2. The optical disk device according to claim 1, wherein said clamping means tilts a surface of said optical disk toward a surface of said turntable after bringing the surface of said optical disk into contact with said turntable, and then said clamping means clamps said inside diameter section of said optical disk to said clamper.

3. The optical disk device according to claim 2, wherein said clamping means sandwiches a part of an outer circumferential section of said optical disk, brings said inside diameter section of said optical disk into contact with said clamper, and presses the sandwiched part, whereby said optical disk is tilted with said inside diameter section as a fulcrum.

4. The optical disk device according to claim 2, wherein said clamping means comprises:
    retaining means for retaining a semicircular portion of said optical disk; and
    shifting means for moving said optical disk toward said turntable with said optical disk being retained by said retaining means.

5. The optical disk device according to claim 4, wherein said retaining means, in a state of retaining the semicircular portion of said optical disk, tilts in advance the side of the semicircular portion retained by pressing said inside diameter section of said optical disk to said clamper.

6. The optical disk device according to claim 4, wherein said retaining means moves said optical disk by means of said shifting means and brings said optical disk into contact with said clamper while retaining said optical disk in an inclined posture.

7. The optical disk device according to claim 4, wherein said retaining means comprises an upper tray and a lower tray which sandwiches the semicircular portion of said optical disk.

8. The optical disk device according to claim 7, wherein in order to hold an outer circumferential section of said optical disk, at least either of said upper tray or said lower tray opens and closes with a side of the outer circumferential section as a fulcrum.

9. The optical disk device according to claim 7, wherein at least said upper tray is dented in a conical shape at an area corresponding to a central side of said optical disk so as to hold an outer circumferential section of said optical disk.

10. The optical disk device according to claim 9, wherein said upper tray has a projection which comes into contact with said inside diameter section and applies pressure to the inside diameter section when said upper tray holds said optical disk.

11. The optical disk device according to claim 4, wherein said shifting means moves along a guide groove formed at a frame of said optical disk device, and said shifting means moves in a direction of inserting and withdrawing said optical disk into and from said optical disk device and moves in a direction of attaching and detaching said optical disk to and from said clamper.

12. The optical disk according to claim 1, wherein said clamper is a ball plunger.

13. An optical disk device comprising:
    an optical pickup which carries out at least either of writing or reading data into or out of an optical disk;
    a turntable which places said optical disk at an operating position of said optical pickup and rotates said optical disk;
    a clamper which is arranged at an approximate center of said turntable and can freely advance and retreat in a direction of a diameter of said optical disk; and
    means for clamping a section of said optical disk at a location directly above said clamper with said optical disk being held by sandwiching said optical disk and for pressing together an inside diameter section of said optical disk and the clamper to clamp said inside diameter section to said clamper, and wherein said clamping means tilts a surface of said optical disk toward a surface of said turntable after bringing the surface of said optical disk into contact with said turntable, and then said clamping means clamps said inside diameter section of said optical disk to said clamper.

14. The optical disk device according to claim 13, wherein said clamping means sandwiches a part of an outer circumferential section of said optical disk, brings said inside diameter section of said optical disk into contact with said clamper, and presses the sandwiched part, whereby said optical disk is tilted with said inside diameter section as a fulcrum.

15. The optical disk device according to claim 13, wherein said clamping means comprises:
   retaining means for retaining a semicircular portion of said optical disk; and
   shifting means for moving said optical disk toward said turntable with said optical disk being retained by said retaining means.

16. The optical disk device according to claim 15, wherein said retaining means, in a state of retaining the semicircular portion of said optical disk, tilts in advance the side of the semicircular portion retained by pressing said inside diameter section of said optical disk to said clamper.

17. The optical disk device according to claim 15, wherein said retaining means moves said optical disk by means of said shifting means and brings said optical disk into contact with said clamper while retaining said optical disk in an inclined posture.

18. The optical disk device according to claim 15, wherein said shifting means moves along a guide groove formed at a frame of said optical disk device, and said shifting means moves in a direction of inserting and withdrawing said optical disk into and from said optical disk device and moves in a direction of attaching and detaching said optical disk to and from said clamper.

19. The optical disk device according to claim 15, wherein said retaining means comprises an upper tray and a lower tray which sandwiches the semicircular portion of said optical disk.

20. The optical disk device according to claim 19, wherein in order to hold an outer circumferential section of said optical disk, at least either of said upper tray or said lower tray opens and closes with a side of said outer circumferential section as a fulcrum.

21. The optical disk device according to claim 19, wherein at least said upper tray is dented in a conical shape at an area corresponding to a central side of said optical disk so as to hold an outer circumferential section of said optical disk.

22. The optical disk device according to claim 21, wherein said upper tray has a projection which comes into contact with said inside diameter section and applies pressure to the inside diameter section when said upper tray holds said optical disk.

23. The optical disk device according to claim 13, wherein said clamper is a ball plunger.

* * * * *